Aug. 30, 1966    R. PORCELLO    3,269,741
STEERABLE STAIR-CLIMBING VEHICLE
Filed Nov. 15, 1965
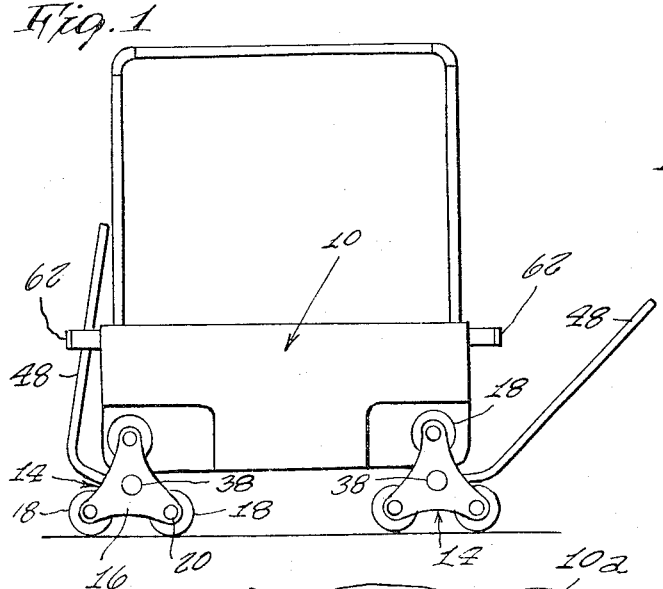
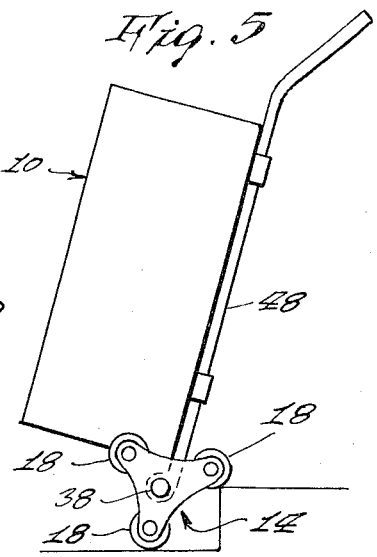
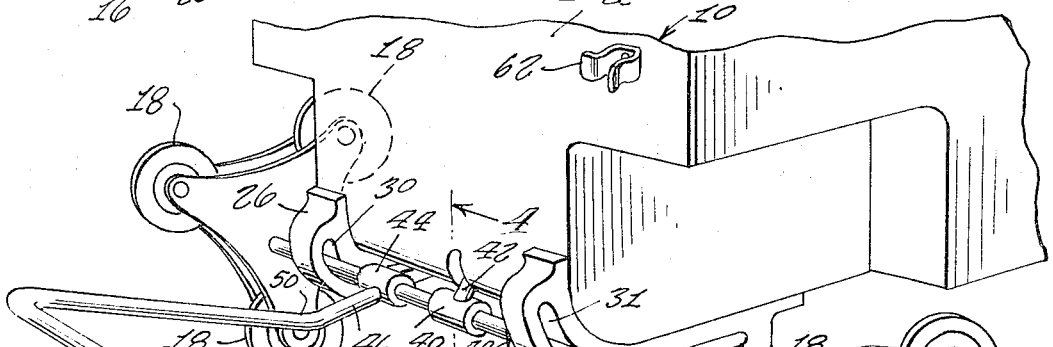
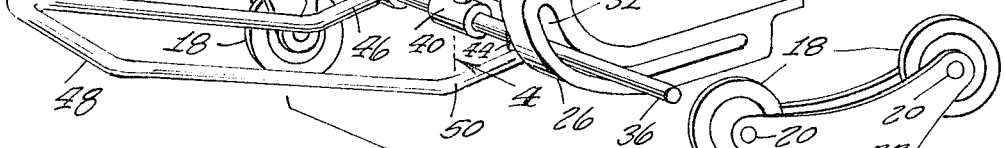
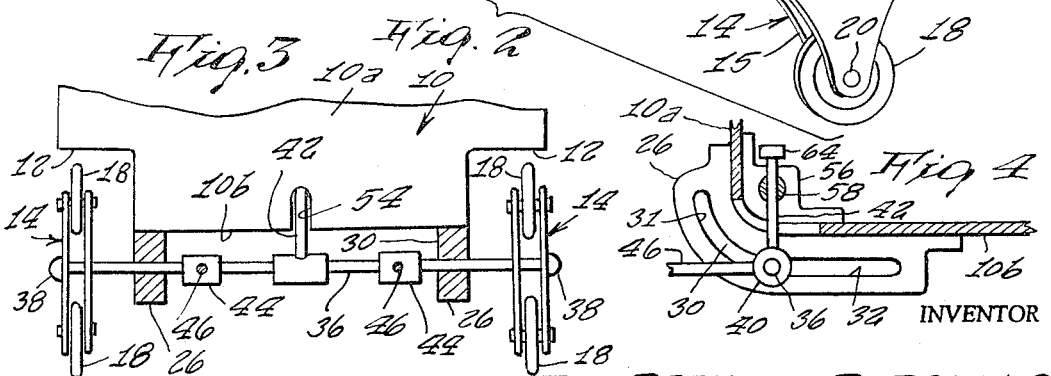
INVENTOR
RAPHAEL PORCELLO
BY Carl Miller
ATTORNEY 3,269,741
STEERABLE STAIR-CLIMBING VEHICLE
Raphael Porcello, Knickerbocker Station, Box 286,
New York 2, N.Y.
Filed Nov. 15, 1965, Ser. No. 507,922
7 Claims. (Cl. 280—5.26)

This invention relates to a wheeled vehicle, and is an improvement over my invention disclosed in U.S. Patent No. 1,887,427, granted November 8, 1932. This application is also a continuation-in-part of my copending application, Serial No. 382,234, filed July 13, 1964, and now abandoned.

The primary object of this invention is to provide a wheeled vehicle having a pair of axle supported wheels at each end thereof to which a handle bar is connected, such that in one position of the handle the wheel and axle unit to which it is connected is held in a fixed relation to the body of the vehicle, while in another position of the handle, the wheel and axle unit may be moved relative to the vehicle body for steering purposes, the wheels on each axle being of the type shown in my prior Patent No. 1,887,427, such as to permit movement of the vehicle over a rough, irregular surface with abrupt changes in height.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 1 is a side elevational view of the wheeled vehicle comprising my invention;

FIGURE 2 is an enlarged fragmentary perspective view of one end of the vehicle of FIGURE 1;

FIGURE 3 is an end elevational view of the lower portion of the vehicle taken on line 3—3 of FIGURE 1;

FIGURE 4 is a detail sectional view of the vehicle taken on line 4—4 of FIGURE 2;

FIGURE 5 shows the wheels at one end of the vehicle in position for movement over an elevated surface, said vehicle being a shopping cart.

Referring now in detail to the drawings, the vehicle made in accordance with my invention is a hand propelled truck having a box-like body 10 provided at each end thereof with a pair of opposite recesses 12. Operable within each recess is a wheeled structure 14 similar to that shown in my prior patent and embodies two plate members 15, 16, having a plurality of small wheels 18 rotatably mounted between the plate members at the corners thereof on individual axles 20, which also serve to hold the plates and wheels in assembled rotation. The sides of the plate members 15, 16 are made arcuate and concave, and are so recessed as to enable the wheel to clear an obstruction or elevation as shown in FIGURE 5. In normal use on a plane surface a pair of wheels 18 of each wheeled structure 14 rides on the same as shown in FIGURE 1. Disposed centrally of each plate member 15, 16 and in axial registry is an opening 22 providing a bearing support for mounting the wheeled structure 14 on the end of an axle as will be hereinafter described.

At each end of the body 10 are a pair of laterally opposed brackets 26. Each bracket 26 has an upper portion 27 and a lower horizontal portion 28, with the upper portion 27 seated on an end wall of the body and the lower portion 27 seated on the bottom or underside of the body 10, as clearly shown in FIGURE 2. Each bracket 26 is provided with a slot 30 extending transversely therethrough having a forward upstanding arcuate portion 31 and a rearwardly extending straight horizontal portion 32. It is to be noted that each pair of laterally opposed brackets 26 are identical including the slots 30 therein. The brackets 26 are secured to the body 10 in any desired manner. It is also to be understood that the vehicle or truck shown in FIGURE 1 may be pulled from either end as will be hereinafter described.

Extending through the slots 30 of each pair of brackets 26 is an axle 36 having a diameter such as to permit a free sliding movement within the slots toward each end thereof, see FIGURE 3. A wheeled structure 14 is mounted on each end of an axle 36 which extends through the bearing 22, and is retained on the axle 36 by a retainer element 38.

Centrally of each axle 36, there is fixedly fitted thereon a collar 40 having integral therewith an upstanding steering pin 42. Mounted on the axle 36 on each side of collar 40 is a sleeve 44 to each of which one end of a handle arm 46 is rigidly secured, see FIGURE 2, the two arms 46 forming part of a U-shaped handle 48, the arms 46 having a like bend intermediate their ends as at 50.

Steering pin 42 extends upwardly into body 10 through a slot 54 formed in the wall 10a thereof as shown in FIGURE 4. The juncture of end wall 10a and bottom wall 10b is arcuate and concentric with the arcuate portion 31 of bracket slot 30, and the slot 54 is correspondingly arcuate. A pair of bearing brackets 56 are disposed inside of body 10, one on each side of steering pin 42 and rotatably support a rock shaft 58. Rock shaft 58 is provided with a transverse bore 60 through which the steering pin 42 extends for sliding reciprocating movement therein. Secured to each end wall 10a is a holding clip 62 for the handle 48. Steering pin 42 has a guided relation in slot 54 such as to permit movement of the pin lengthwise of the slot and to preclude lateral movement of the axle 36 in the slots 30.

Viewing FIGURE 1, it is seen that the handle 48 at the right is lowered and in pulling position. The handle 48 at the left is raised and in a locked and inoperative position being held thus by the holding clip 62. As seen in FIGURE 2, the handle 48 is in a lowered pulling and operative position while the opposite handle 48 (not shown) is raised and held inoperative by the holding clip 62 on the other end wall of the body. Viewing FIGURE 2, it is seen that when a pull is applied to the handle 48, the axle 36 will be moved into the arcuate portion 31 of the slots 30 in the brackets 26 to be fixedly held thereby in its horizontal transverse position. This forward movement of the axle 36 is permitted by movement of the steering pin 42 in slot 54 as well as by its axial movement in bore 60 of rock shaft 58. When it is desired to steer the vehicle a backward push on the handle 48 will move the axle 36 into the straight horizontal portions 32 of the slots 30 to permit the required turning of the axle 36 accommodated by turning of the steering pin 42 in the bore 60 of the rock shaft 58. When steering is completed, a pull on the handle 48 will again move the axle 36 back into the arcuate portion 31 of slots 30 to be held fixed therein as heretofore indicated.

Referring to FIGURE 5, there is shown a three wheeled device incorporated in a shopping cart. Therefore, it should be clearly understood, that this invention can be embodied in any vehicle requiring surface elevation, such as baby carriages, shopping carts and other surface vehicles.

The upper free end of steering pin 42 is provided with a flanged head 64. If desired, a compression coil spring (not shown) may be placed around steering pin 42 between head 64 and rock shaft 58. Though not essential to the operation of the device, such a spring under compression would act to hold the axle 36 in the arcuate portions 31 of slots 30 when the vehicle is being pulled, or when the handle 48 of one axle is held in a raised and inoperative position.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. A vehicle comprising:
    (a) a body having end walls, side walls and a bottom wall,
    (b) a pair of brackets at each end of the vehicle and each secured to an associated end wall and an adjacent portion of the bottom wall,
    (c) said brackets of each pair lying in transverse horizontal alignment,
    (d) corresponding like slots in each bracket providing a forward upstanding arcuate portion and a rearward straight horizontal portion,
    (e) an axle extending through the slots in each said pair of brackets,
    (f) a wheeled structure rotatably mounted on the end of each axle, and
    (g) a handle member secured to each axle and movable with said axle from a raised inoperative position to a lowered operative position to pull said vehicle,
    whereby one said handle when in said lowered pulling position will on a pull thereon move said axle into the arcuate portion of said slots so as to retain the same in fixed transverse relation to said body and on a rearward push of said handle relative to said body said axle will be moved into the straight horizontal portion of said slots to permit steering of said axle.

2. The vehicle of claim 1, including:
    (a) a collar secured to an intermediate portion of each axle,
    (b) an upstanding steering pin rigid with each collar,
    (c) there being a slot at each end of the body located in the associated end wall and adjacent bottom wall portion of each pair of brackets,
    (d) each said steering pin extending upwardly through the slot at each end of said body,
    (e) a rock shaft having a transverse bore positioned within said body adjacent each slot therein,
    (f) bearing means rotatably supporting each said rock shaft, and
    (g) each said steering pin extending through the bore of an associated rock shaft for combined rotative and reciprocating axial movement therein,
    whereby each said steering pin in its guided movement within its associated slot will prevent axial movement of its associated axle within the slots of the brackets receiving the same, and when said axle is placed in the horizontal straight portion of said bracket slots a turning movement of said axle to effect steering thereof will be about the axis of said steering pin.

3. The vehicle of claim 2, wherein:
    (a) the side walls of said body at each of the lower ends thereof are each recessed to accommodate a wheeled structure.

4. The vehicle of claim 3, wherein:
    (a) said arcuate portion of said bracket slots and the slot in the body receiving said steering pin are in concentric relation.

5. The vehicle of claim 4, including:
    (a) a holding clip means on each end wall of the body for detachably retaining the handle thereat in its raised inoperative position.

6. The vehicle of claim 5, wherein each wheeled structure comprises:
    (a) a pair of polygonal plates having concave side edges arranged in corresponding opposed relation,
    (b) a wheel at each corner of said plates and between the same,
    (c) axle means rotatably mounting, each wheel extending through said plates and including means to hold said plates and wheels in assembled relation,
    whereby at least two of the wheels of a wheeled structure will roll on a supporting surface as the vehicle moves thereover, and differences in elevation of said supporting surface will effect a rotative movement of the wheeled structure on its axle to accommodate rolling engagement of said wheels thereon.

7. The vehicle of claim 6, including
    (a) spring means surrounding said steering pin between the upper free terminal end thereof and said rock shaft whereby to assist in holding the axle associated therewith in its fixed relation within the arcuate portions of its associated bracket slots.

References Cited by the Examiner

UNITED STATES PATENTS

| | | | |
|---|---|---|---|
| 230,676 | 8/1880 | Taylor | 280—47.37 |
| 1,887,427 | 11/1932 | Porcello | 280—5.28 |
| 2,400,824 | 5/1946 | Jackson | 280—5.26 X |
| 3,058,754 | 10/1962 | Whitaker | 280—5.26 |

LEO FRIAGLIA, *Primary Examiner.*